(12) United States Patent
Tao et al.

(10) Patent No.: US 11,890,714 B2
(45) Date of Patent: Feb. 6, 2024

(54) REMANUFACTURING METHOD OF DRILL

(71) Applicant: TCT GLOBAL LIMITED, Tsuen Wan (HK)

(72) Inventors: Chia Li Tao, Taoyuan Hsien (TW); Nick Sung-Hao Chien, Taoyuan Hsien (TW); Li-Yi Chao, Taoyuan Hsien (TW); Chen-Kuang Sun, Taoyuan Hsien (TW); Cheng Chia Lee, Taoyuan Hsien (TW); Ming-Yuan Zhao, Taoyuan Hsien (TW)

(73) Assignee: TCT GLOBAL LIMITED, Tsuen Wan (HK)

( * ) Notice: Subject to any disclaimer, the term of this patent is extended or adjusted under 35 U.S.C. 154(b) by 397 days.

(21) Appl. No.: 17/365,327

(22) Filed: Jul. 1, 2021

(65) Prior Publication Data
US 2022/0355432 A1 Nov. 10, 2022

(30) Foreign Application Priority Data

May 7, 2021 (TW) .................................. 110116642

(51) Int. Cl.
*B24B 3/24* (2006.01)
*B23B 51/02* (2006.01)

(52) U.S. Cl.
CPC ................ *B24B 3/24* (2013.01); *B23B 51/02* (2013.01)

(58) Field of Classification Search
CPC ....... B24B 3/24; B23B 51/02; B23B 2251/40; B23P 15/32

USPC ....................................................... 76/108.6
See application file for complete search history.

(56) References Cited

U.S. PATENT DOCUMENTS

| | | | |
|---|---|---|---|
| 3,584,420 A * | 6/1971 | Southland ................ | B24B 3/24 451/216 |
| 6,234,881 B1 * | 5/2001 | Martin, Jr. ............... | B24B 3/24 451/48 |
| 2004/0101379 A1 * | 5/2004 | Mabuchi ................. | B24B 19/04 408/230 |

(Continued)

*Primary Examiner* — Phong H Nguyen
(74) *Attorney, Agent, or Firm* — MUNCY, GEISSLER, OLDS & LOWE, P.C.

(57) ABSTRACT

A remanufacturing method of a drill includes providing a drill with a worn-out area. The drill comprises: a shank part; and a flute part arranged on one end of the shank part. A chisel edge is formed on the front end of the flute part, and the radius of any one of the cross section of the chisel edge is defined as a core thickness; a first blade and a second blade with tilt directions toward the shank part are formed on the two sides of the chisel edge. The first circumferential surface of the first blade and the second circumferential surface of the second blade are respectively extended and spiraled toward the shank part along a periphery of the flute part and form two helical cutting edges, a first debris-discharging groove and a second debris-discharging groove. The first blade comprises a first cutting edge. The first cutting edge and the first circumferential surface define the worn-out area. The method also includes a step of aligning a grinding wheel to the worn-out area; and a step of using the aligned grinding wheel to perform a cutting operation along the helical cutting edge or the first debris-discharging groove to grind and repair the worn-out area of the drill.

10 Claims, 10 Drawing Sheets

(56) References Cited

U.S. PATENT DOCUMENTS

2013/0118313 A1* 5/2013 Mehrotra ............ B24B 27/0076
　　　　　　　　　　　　　　　　　　　　　451/48
2014/0140782 A1* 5/2014 Lampe .................... B23C 3/32
　　　　　　　　　　　　　　　　　　　　　451/48
2020/0324348 A1* 10/2020 Yoshioka ................ B23B 51/02

* cited by examiner

REMANUFACTURING METHOD OF DRILL

CROSS REFERENCES

This Application claims benefit of TW Patent Application No. 110116642 filed on 2021 May 7 and titled as "REMANUFACTURING METHOD OF DRILL", the disclosure of which is hereby incorporated by references.

1. FIELD OF THE INVENTION

The present invention relates to a drill manufacturing method, particularly to a remanufacturing method of a drill with a worn-out area.

2. DESCRIPTION OF THE PRIOR ART

In the fabrication of printed circuit boards, micro drills are usually used to drill holes. Micro drills are worn gradually in usage, and the cutting ability and debris discharging ability thereof will become insufficient finally. Then, the worn-out micro drills would be replaced. Thus, the fabrication cost of printed circuit boards increases. Besides, the manufacturers demand higher and higher precision and quality of drilled holes. Consequently, the damaged drills must be replaced even though they are only slightly worn. It is a matter of waste in fact. On the other hand, some unqualified products would appear in the fabrication of drills. Compared with the heavily unqualified products or the abandoned-level products, the slightly unqualified drills may be remanufactured for usage so as to reduce waste. Accordingly, the present invention proposes a remanufacturing method of a drill, which can remanufacture a drill with worn-out areas to restore the drill to have the original cutting ability and the original debris discharging ability and make the drill be used once again, whereby to decrease waste and reduce fabrication cost.

SUMMARY OF THE INVENTION

In order to solve the abovementioned problems, the present invention provides a remanufacturing method of a drill, wherein a drill with worn-out areas is remanufactured to restore the drill to have the original cutting ability and the original debris discharging ability, whereby to decrease waste and reduce fabrication cost.

In order to achieve the abovementioned objective, one embodiment of the present invention provides a remanufacturing method of a drill. The drill comprises a shank part and a flute par. The flute part is arranged on one end of the shank part. A chisel edge is formed on the front end of the flute part. Any one of the radius of the cross section of the chisel edge is defined as the core thickness. A first blade and a second blade are respectively formed obliquely from two sides of the chisel edge toward the shank part. A first circumferential surface of the first blade and a second circumferential surface of the second blade are respectively extended helically along the an outer surface of the flute part toward the shank part to form two helical cutting edges, a first debris-discharging groove and a second debris-discharging groove. The first blade has a first cutting edge. The worn-out area of the drill is defined by the first cutting edge and the first circumferential surface. The remanufacturing method of a drill of the present invention comprises steps: providing a drill with a worn-out area; aligning a grinding wheel to the worn-out area, including aligning a center of the chisel edge to a center of the grinding wheel, and aligning the first circumferential surface to a tangential edge of the grinding wheel; and using the aligned grinding wheel to perform a cutting operation along the helical cutting edge or the first debris-discharging groove to grind and repair the worn-out area of the drill and restore the cutting ability of the drill.

In one embodiment, the worn-out area includes a primary worn-out area, which is located at a junction of the first cutting edge and the first circumferential surface; a first secondary worn-out area, which is located at a wall surface extended from the first cutting edge to the first debris-discharging groove; and a second secondary worn-out area, which is an area extended from the primary worn-out area to the first circumferential surface.

In one embodiment, the grinding wheel is aligned to the first secondary worn-out area to perform a cutting operation to the drill along the first debris-discharging groove.

In one embodiment, the grinding wheel is aligned to the first secondary worn-out area and the first cutting edge to perform a cutting operation to the drill along the first debris-discharging groove.

In one embodiment, the grinding wheel is aligned to the second secondary worn-out area to perform a cutting operation to the drill along the helical cutting edge.

In one embodiment, the grinding wheel is respectively aligned to the first secondary worn-out area and the second secondary worn-out area to perform a cutting operation along the first debris-discharging groove and the helical cutting edge.

In one embodiment, the grinding wheel performs a cutting of a length of 0.2-12.0 mm along the helical cutting edge toward the shank part.

In one embodiment, the grinding wheel performs a cutting of a length of 0.2-12.0 mm along the first debris-discharging groove toward the shank part.

In one embodiment, the step of aligning the center of the chisel edge to the center of the grinding wheel further includes a step of working out a preset depth value according to Equation (1):

$$(\text{a radius of the grinding wheel} + \text{a core thickness of the drill}) - \text{a distance from the center of the grinding wheel to the center of the drill}.$$

In one embodiment, the step of aligning the first circumferential surface to a tangential edge of the grinding wheel further includes a step of obtaining a preset angle value via calculating a distance from a terminal of the first circumferential surface, which is far away from the first cutting edge, to the tangential edge of the grinding wheel.

Below, embodiments are described in cooperation with the attached drawings to make easily understood the objectives, technical contents, characteristics, and accomplishments of the present invention.

DESCRIPTION OF THE PREFERRED EMBODIMENT

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, minor details are not necessarily depicted in the drawings to achieve conciseness of the drawings.

Figure 1:
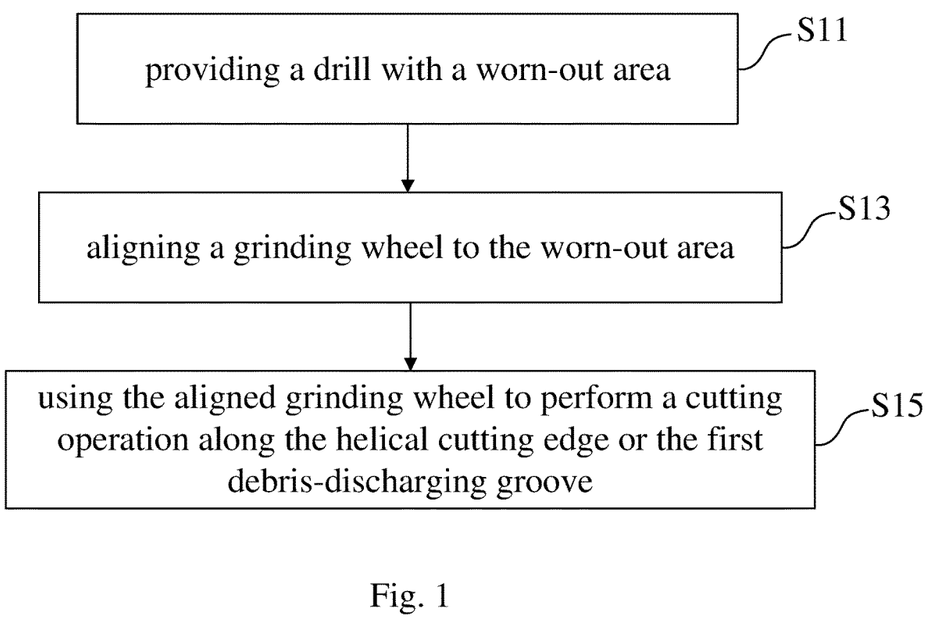
FIG. 1 is a flowchart of a remanufacturing method of a drill according to one embodiment of the present invention.
Figure 2:
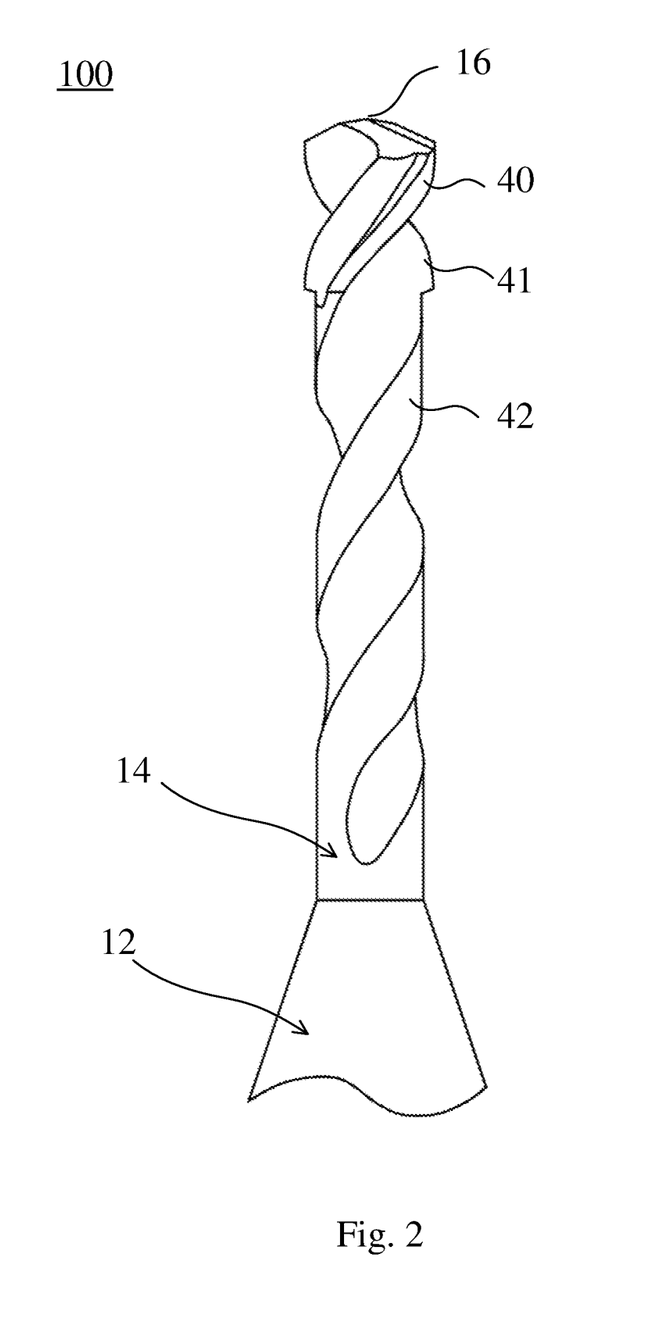
FIG. 2 is a diagram schematically showing the structure of a drill according to one embodiment of the present invention.
Figure 3:
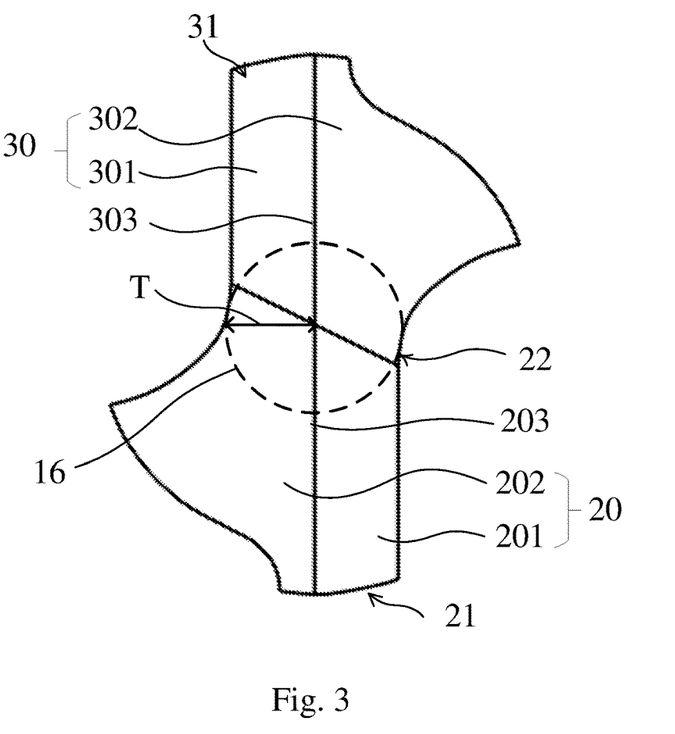
FIG. 3 is a top view schematically showing the top view of end of a drill according to one embodiment of the present invention.
Figure 4:
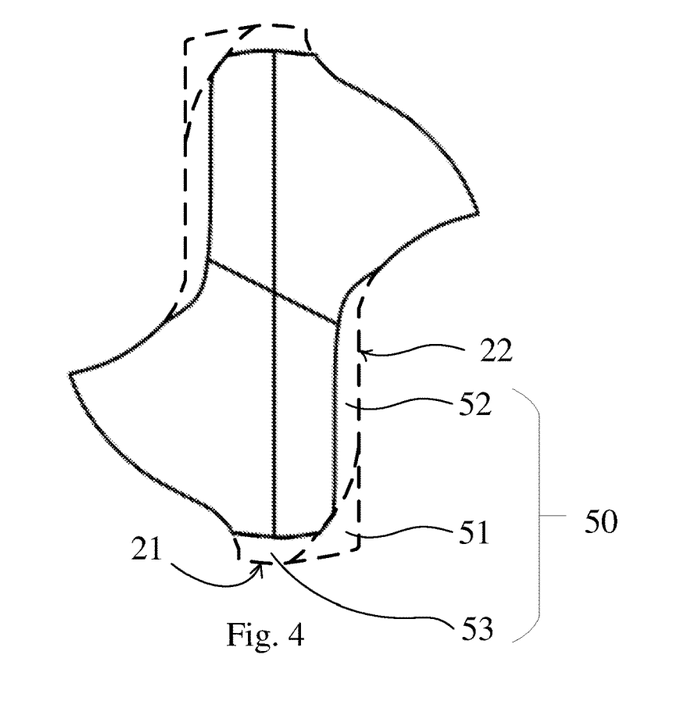
FIG. 4 is a top view schematically showing the top view of end of a drill with worn-out areas according to one embodiment of the present invention.

The present invention provides a remanufacturing method of a drill. Refer to FIG. 1 for a flowchart of a remanufacturing method of a drill according to one embodiment of the present invention. Firstly, provide a drill with worn areas (Step S11). It should be explained: the spirit of the present invention is to remanufacture a worn drill to restore the cutting ability thereof as much as possible and enable the drill to be used in drilling operations. The evaluation of the restored cutting ability of a drill is to be described thereinafter. Refer to FIGS. 2-4. A drill 100 may comprises a shank part 12 and a flute part 14. The flute part 14 is arranged on one end of the shank part 12. A chisel edge 16 is formed on the front end of the flute part 14. The radius of any one of the cross section of the chisel edge 16 is defined as the core thickness T, as shown in FIG. 3. A first blade 20 and a second blade 30 are respectively formed obliquely from two sides of the chisel edge 16 toward the shank part 12. A first circumferential surface 21 of the first blade 20 and a second circumferential surface 31 of the second blade 30 are respectively extended helically along the an outer surface of the flute part 14 toward the shank part 12 to form two helical cutting edges 40, a first debris-discharging groove 41 and a second debris-discharging groove 42.

Refer to FIG. 3. In one embodiment, the first blade 20 includes a first primary blade 201 and a first secondary blade 202; the first primary blade 201 is connected with the first secondary blade 202 through a first prism 203; the second blade 30 includes a second primary blade 301 and a second secondary blade 302; the second primary blade 301 is connected with the second secondary blade 302 through a second prism 303. However, the present invention is not limited by this embodiment. The remanufacturing method of present invention may also be applied to a double-blade drill (not shown in the drawings) or other drills with asymmetric blades (not shown in the drawings).

Refer to FIG. 4. During a drilling process, the junction of a first cutting edge 22 and a first circumferential surface 21 is normally the place contacting the hole wall and applying force. Thus, these places of a drill are likely to be worn out by usage. In the present invention, the regions worn out after drilling operations are referred to as worn-out areas 50, which may be defined by the wall and edge of the first cutting edge 22 and the first circumferential surface 21. In one embodiment, the worn-out area 50 includes a primary worn-out area 51, a first secondary worn-out area 52 and a second secondary worn-out area 53. The primary worn-out area 51 is located at the edge surface of the junction of the first cutting edge 22 and the first circumferential surface 21. The first secondary worn-out area 52 is located at the wall surface extended from the first cutting edge 22 to the first debris-discharging groove 41. The second secondary worn-out area 53 is the area extended from the primary worn-out area 51 to the first circumferential surface 21.

In FIG. 4, the dotted line indicates the profile of the drill before it is worn out; the solid line indicates the profile of the drill having been worn out. FIG. 4 shows that the drill is fully worn out in the primary worn-out area 51, the first secondary worn-out area 52 and the second secondary worn-out area 53. However, FIG. 4 is only schematically depicted for convenience of explanation. The present invention is not limited by FIG. 4. As long as abrasion appears in at least one of the primary worn-out area 51, the first secondary worn-out area 52 and the second secondary worn-out area 53 of a drill, the method of the present invention may be used to remanufacture the drill.

It should be explained: the term "worn out" or "abrasion" is not only referred to the abrasion or damage caused by usage but also referred to the unqualified product that does not meet the specification of a drill. In other words, the remanufacturing method of the present invention is not only applied to repair the drill worn out by usage but also applied to remanufacture the unqualified product generated in fabrication. The unqualified drill does not meet the specification in the worn-out area 50 shown in FIG. 4. For example, the drill whose length, thickness or angle of a related area does not meet the specification of a drill is included by the application scope of the method of the present invention.

Figure 5:
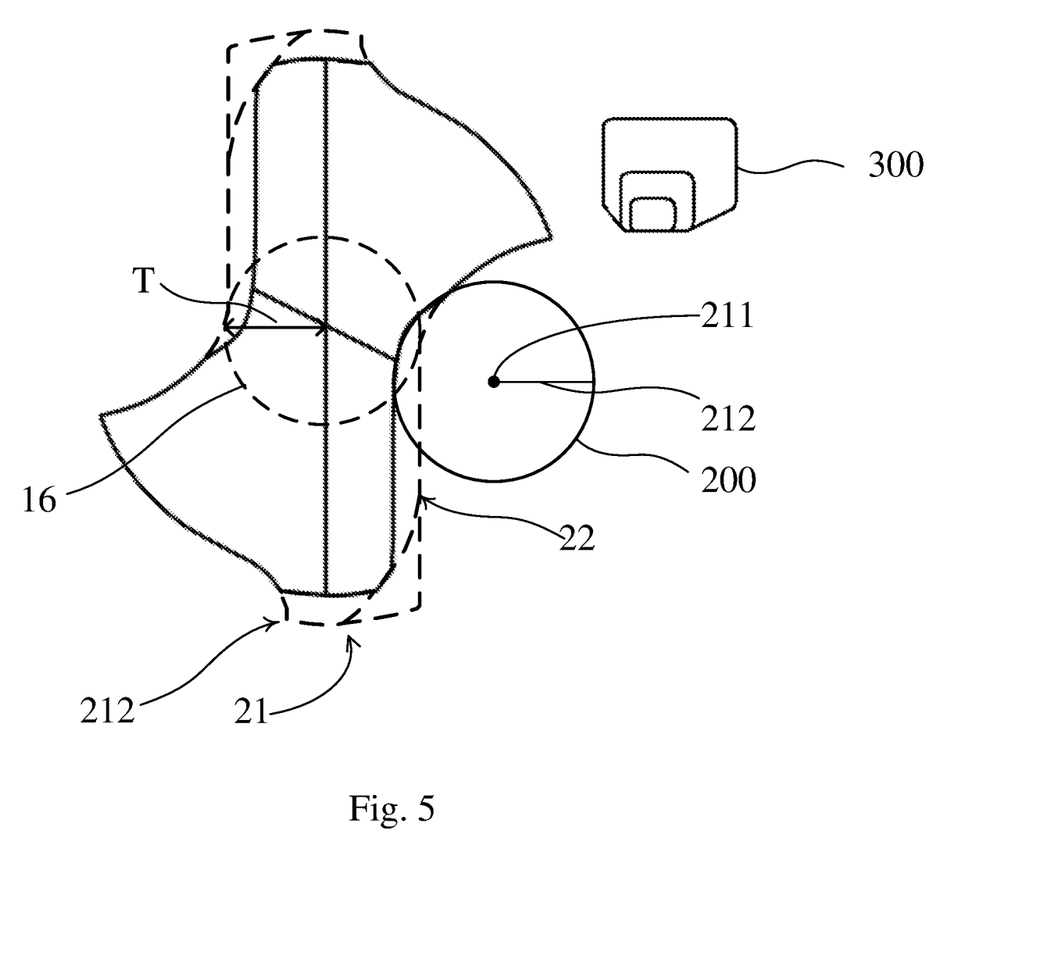
FIG. 5 is a diagram schematically showing that a grinding wheel is aligned to a drill according to one embodiment of the present invention.
Figure 6:
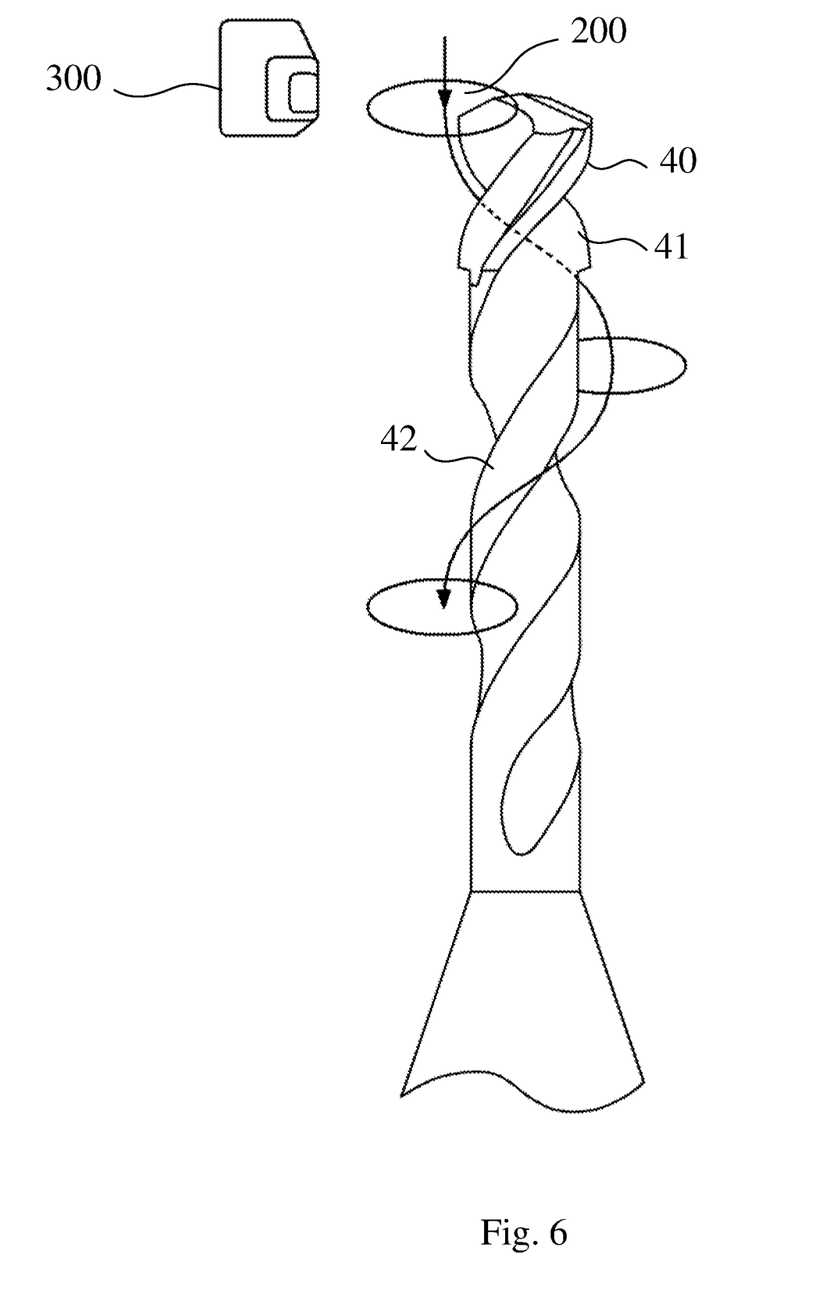
FIG. 6 is a diagram schematically showing that a grinding wheel performs a cutting operation according to one embodiment of the present invention.

Refer to FIG. 5 for the description of a step S13: aligning a grinding wheel 200 to the worn-out area 50. In the step S13 of aligning a grinding wheel 200 to the worn-out area 50, the alignments should be undertaken in three directions: 1. the depthwise direction: the center of the grinding wheel is aligned to the center of the chisel edge of the drill; 2. the angular direction: the tangential edge of the grinding wheel is aligned to the circumferential surface of the drill; 3. the lengthwise direction: the grinding wheel is aligned to the flute part of the drill. The step of the depthwise alignment is to guarantee that the depth value of the overlapping of the grinding wheel and the drill meets a preset depth value. The depth value of the overlapping is calculated according to Equation (1):

$$\text{(the radius of the grinding wheel+the core thickness of the drill)-the distance from the center of the grinding wheel to the center of the drill} \quad \text{Equation (1):}$$

The step of the angular alignment is to guarantee that the angle by which the grinding wheel cuts the drill meets a preset angle value. The angle value is obtained via calculating the distance from a terminal 212 of the first circumferential surface 21, which is far away from the first cutting edge 22, to the tangential edge of the grinding wheel. The step of the lengthwise alignment is to guarantee that the length by which the grinding wheel 200 cuts the drill from the chisel edge 16 to the shank part 12 meets a preset length value. A sensor 300 is used to determine whether the alignment of the grinding wheel 200 and the drill 100 meets the preset depth value, the preset angle value and the preset length value. It should be explained: each of the preset depth value, the preset angle value and the preset length value may fall into different ranges according to the requirement, the drill size, the abrasion extent of the drill, or the unqualified extent of the drill. For example, the preset depth value may vary in a range of 0.01-3.00 mm; the preset angle value may vary in a range of 0-360 degrees; the preset length value may vary in a range of 0.5-12.0 mm.

In one embodiment, the sensor 300 is used to determine whether the grinding wheel 200 is exactly aligned to the worn-out area 50 of a drill, wherein the alignment operation is performed via detecting the abovementioned preset depth value, preset angle value and preset length value. However, the present invention is not limited by this embodiment. The present invention may use another method to align the grinding wheel to the drill. For example, an image capture device may be used in the alignment operation.

Next, undertake a step S15: using the aligned grinding wheel 200 perform a cutting operation to the drill along the helical cutting edge 40, the first debris-discharging groove 41 and the second debris-discharging groove 42 to grind and repair the worn-out area of the drill, whereby to restore the cutting ability of the drill. In practice, the cutting ability of a drill is evaluated via measuring the roughness of the hole wall after a hole has been drilled. In general, the smaller the roughness of a hole wall, the better the cutting ability of a drill. The roughness of a hole drilled by a brand new drill is smaller than the roughness of a hole drilled by a used drill.

Figure 7:
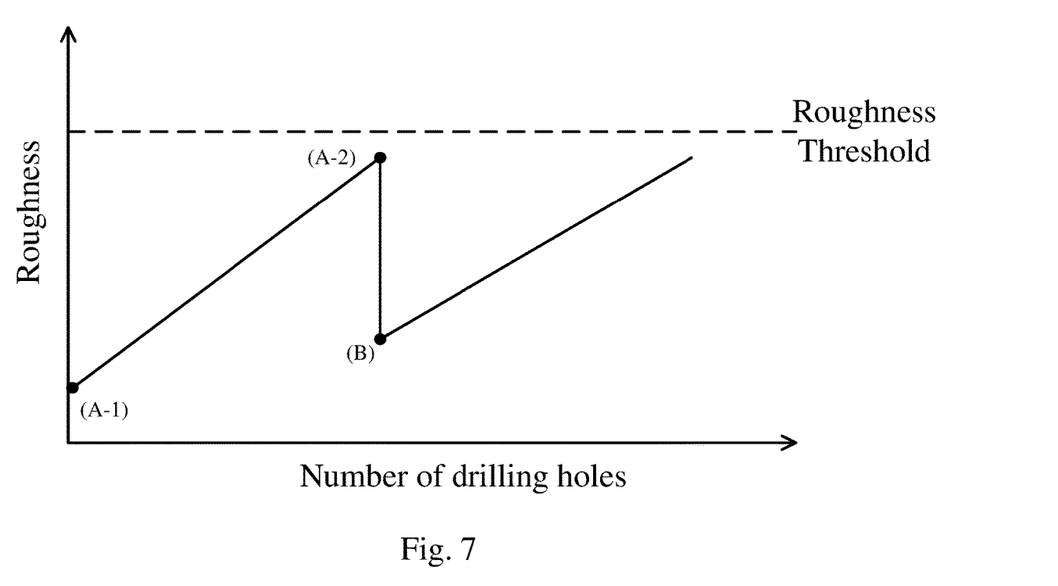
FIG. 7 shows the roughness of the holes drilled by a drill at different stages of usage.

Refer to FIG. 7. In FIG. 7, the point (A-1) represents the roughness of the wall of a hole drilled by a brand new drill, such as a roughness of 5-10 μm. With the increased number of drilling operations, the roughness of the wall of a hole also increases. Once the roughness of the hole wall exceeds a threshold line, it is determined that the cutting ability of the drill is too low to undertake a cutting work. In general, the threshold of the roughness is set be within a range according to requirement, such as within a range of 10-25 μm. It is preferred: the threshold of the roughness is 25 μm. The point (A-2) represents the roughness of the wall of a hole drilled by a used drill, such as a roughness of 10-20 μm. After the used drill has been remanufactured in the method of the present invention, the roughness of the wall of the hole drilled by the remanufactured drill is significantly decreased to the point (B), such as a roughness of 10-15 μm. Therefore, the method of the present invention can restore the cutting ability of a drill and prolong the service life of a drill.

Figure 8:
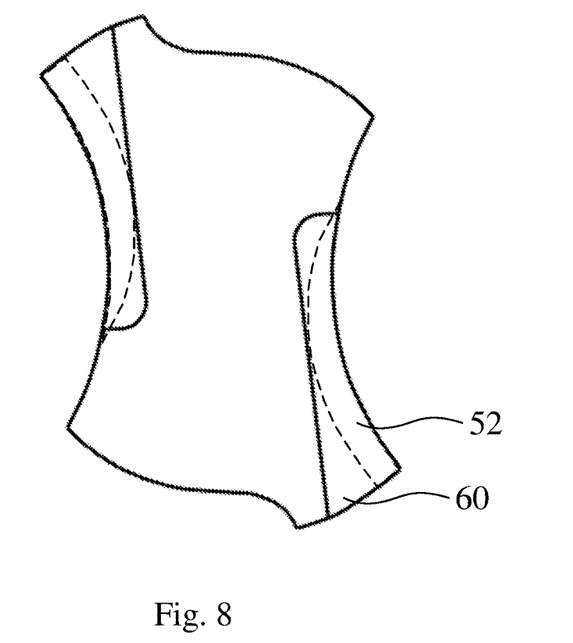
FIG. 8 is a diagram schematically showing that a grinding wheel is aligned to a drill according to one embodiment of the present invention.
Figure 9:
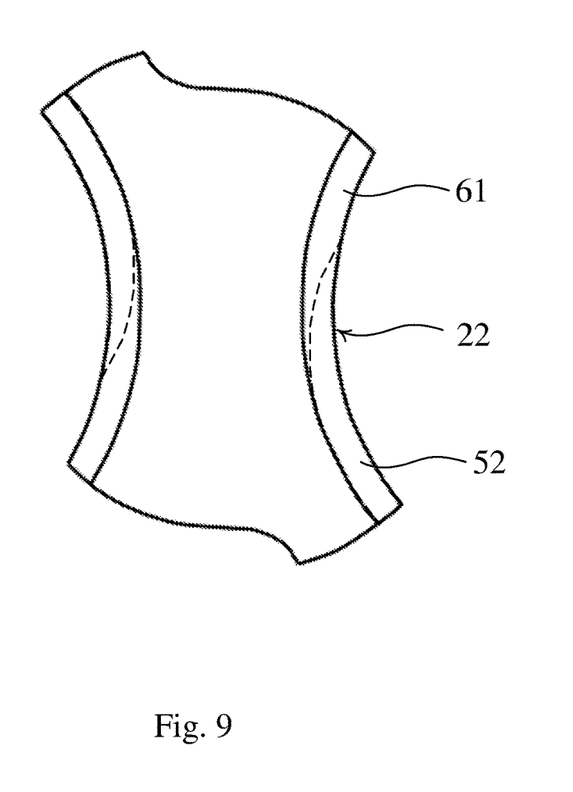
FIG. 9 is a diagram schematically showing that a grinding wheel is aligned to a drill according to another embodiment of the present invention.

Refer to FIG. 5. In one embodiment, the grinding wheel 200 may be only aligned to the first secondary worn-out area 52 of a drill to perform a cutting operation to the drill along the first debris-discharging groove 41. However, the present invention is not limited by this embodiment. The grinding 200 may be completely or partly aligned to the first secondary worn-out area 52 of a drill to perform a cutting operation to the drill. For an example, the shape of the grinding wheel 200 is not completely identical to the shape of the first secondary worn-out area 52. Thus, the region, which the cutting operation is performed to, covers an area 60, which is outside the first secondary worn-out area 52, as showing in FIG. 8. For another example, the grinding wheel is aligned to the first secondary worn-out area 52 and the first cutting edge 22. Thus, the region, which the cutting operation is performed to, covers an area 61, which is outside the first secondary worn-out area 52, as showing in FIG. 9.

Figure 10:
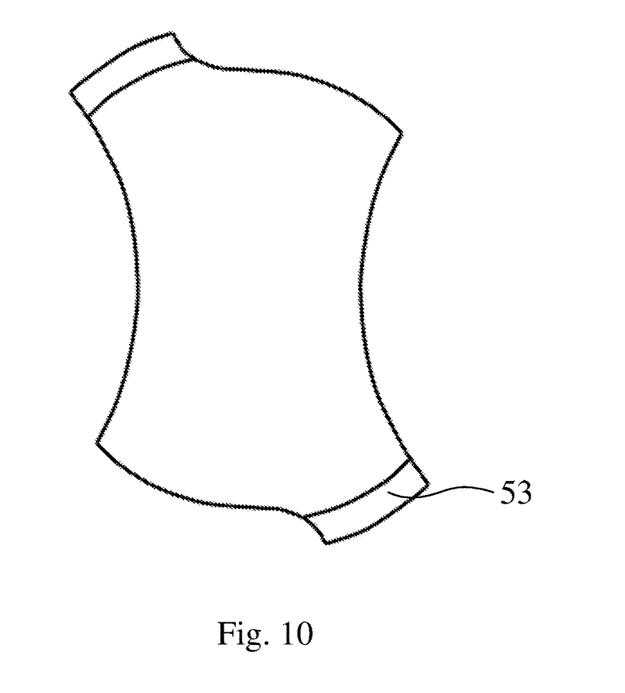
FIG. 10 is a diagram schematically showing that a grinding wheel is aligned to a drill according to yet another embodiment of the present invention.
Figure 11:
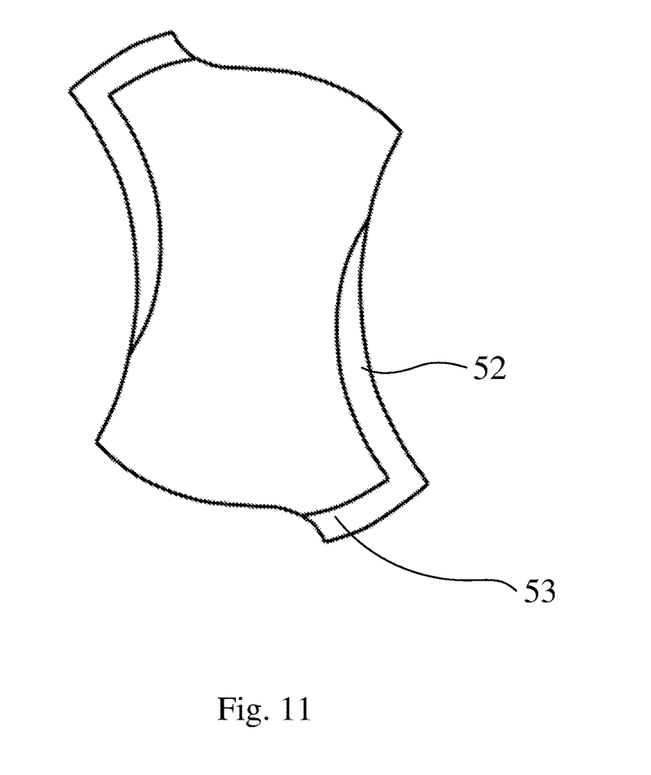
FIG. 11 is a diagram schematically showing that a grinding wheel is aligned to a drill according to still another embodiment of the present invention.
Figure 12:
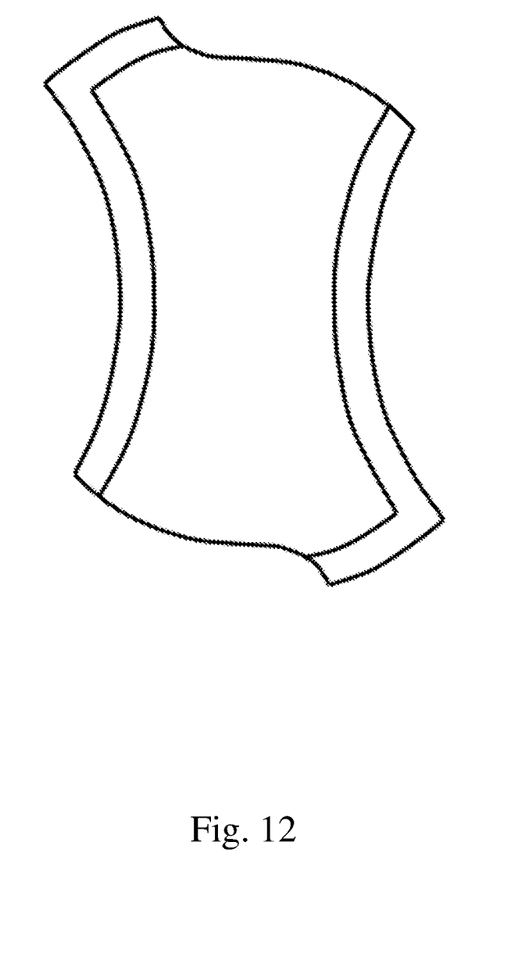
FIG. 12 is a diagram schematically showing that a grinding wheel is aligned to a drill according to a further embodiment of the present invention.

Refer to FIG. 10. In one embodiment, the grinding wheel 200 may be aligned to the second secondary worn-out area 53 of a drill to perform a cutting operation to the drill along the helical cutting edges 40. Refer to FIG. 11. In one embodiment, the grinding wheel 200 may be aligned to the first secondary worn-out area 52 and the second secondary worn-out area 53 of a drill to perform a cutting operation to the drill along the first debris-discharging groove 41 and the helical cutting edge 40. Refer to FIG. 12. In one embodiment, the grinding wheel 200 may be aligned to the entire first circumferential surface 21 and the entire first cutting edge 22 of a drill to perform a cutting operation to the drill along the first debris-discharging groove 41 and the helical cutting edge 40. In practice, if only one of the helical cutting edges and the debris-discharging grooves is worn out, the remanufacturing operation may be only performed to the worn-out one. Although the drawings do not show the grinding wheels of different shapes, the grinding wheel may have different shapes according to requirement. Besides, the worn-out state of a drill may be analyzed to determine the start point of the cutting operation so as to achieve an optimized cutting path.

Figure 13:
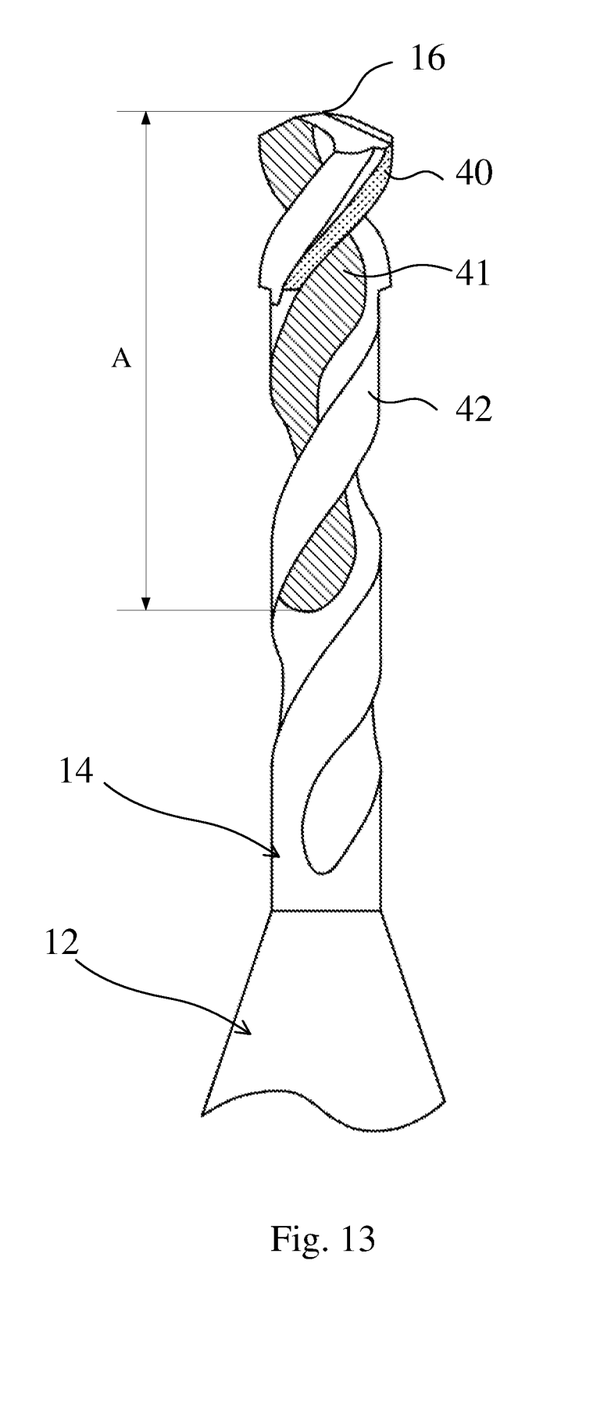
FIG. 13 is a diagram schematically showing that a grinding wheel performs a cutting of a length A according to one embodiment of the present invention.

In one embodiment, the grinding wheel 200 performs a cutting of a length of 0.2-12.0 mm along the first debris-discharging groove 41 or the helical cutting edge 40 toward the shank part. In detail, the length A may be a length extended from the chisel edge 16 toward the shank part 12, as shown in FIG. 13.

In conclusion, the present invention provides a remanufacturing method of a drill, wherein a grinding wheel is aligned to a first secondary worn-out area, a second secondary worn-out area, a first cutting edge or a combination thereof to perform a cutting operation to a worn-out drill, whereby to restore the cutting ability and debris discharging ability of the drill. Further, the method of the present invention can also remanufacture the unqualified drill generated in the fabrication process, whereby the remanufactured drill can meet the specification and work for drilling operations. Therefore, the present invention can reduce the fabrication cost and prevent from wasting material.

The embodiments mentioned above are to demonstrate the technical thoughts and characteristics of the present invention to enable the persons skilled in the art to understand, make, and use the present invention. However, these embodiments are only to exemplify the present invention but not to limit the scope of the present invention. Any equivalent modification or variation according to the spirit of the present invention is to ne also included by the scope of the present invention.

What is claimed is:

1. A remanufacturing method of a drill, comprising:
providing a drill with a worn-out area, wherein the drill includes
a shank part; and
a flute part, disposed at one end of the shank part, wherein a chisel edge is formed on a front end of the flute part; a radius of any one of the cross section of the chisel edge is defined as a core thickness; a first blade and a second blade are respectively obliquely extended from two sides of the chisel edge toward the shank part; a first circumferential surface of the first blade and a second circumferential surface of the second blade are respectively helically extended along an outer diameter of the flute toward the shank part to form two helical cutting edges, a first debris-discharging groove and a second debris-discharging groove; the first blade has a first cutting edge; the first cutting edge and the first circumferential surface define the worn-out area;
aligning a grinding wheel to the worn-out area, including aligning a center of the chisel edge to a center of the grinding wheel, and aligning the first circumferential surface to a tangential edge of the grinding wheel; and
using the aligned grinding wheel to perform a cutting operation along the helical cutting edge or the first debris-discharging groove to grind and repair the worn-out area of the drill and restore a cutting ability of the drill.

2. The remanufacturing method of a drill according to claim 1, wherein the worn-out area includes:
a primary worn-out area, located at a junction of the first cutting edge and the first circumferential surface;
a first secondary worn-out area, located at a wall surface extended from the first cutting edge to the first debris-discharging groove; and
a second secondary worn-out area, being an area extended from the primary worn-out area to the first circumferential surface.

3. The remanufacturing method of a drill according to claim 2, wherein the grinding wheel is aligned to the first secondary worn-out area to perform a cutting operation to the drill along the first debris-discharging groove.

4. The remanufacturing method of a drill according to claim 2, wherein the grinding wheel is aligned to the first secondary worn-out area and the first cutting edge to perform a cutting operation to the drill along the first debris-discharging groove.

5. The remanufacturing method of a drill according to claim 2, wherein the grinding wheel is aligned to the second secondary worn-out area to perform a cutting operation to the drill along the helical cutting edge.

6. The remanufacturing method of a drill according to claim 2, wherein the grinding wheel is respectively aligned to the first secondary worn-out area and the second secondary worn-out area to perform a cutting operation along the first debris-discharging groove and the helical cutting edge.

7. The remanufacturing method of a drill according to claim 1, wherein the grinding wheel performs a cutting of a length of 0.2-12.0 mm along the helical cutting edge toward the shank part.

8. The remanufacturing method of a drill according to claim 1, wherein the grinding wheel performs a cutting of a length of 0.2-12.0 mm along the first debris-discharging groove toward the shank part.

9. The remanufacturing method of a drill according to claim 1, wherein the step of aligning the center of the chisel edge to the center of the grinding wheel further includes a step of working out a preset depth value according to Equation (1):

(a radius of the grinding wheel+a core thickness of the drill)−a distance from the center of the grinding wheel to the center of the drill.

10. The remanufacturing method of a drill according to claim 1, wherein the step of aligning the first circumferential surface to a tangential edge of the grinding wheel further includes a step of obtaining a preset angle value via calculating a distance from a terminal of the first circumferential surface, which is far away from the first cutting edge, to the tangential edge of the grinding wheel.

* * * * *